United States Patent [19]

Kikuchi

[11] Patent Number: 5,474,803
[45] Date of Patent: Dec. 12, 1995

[54] METHOD FOR PREPARING COMPOSITE PARTICLES

[75] Inventor: Yuji Kikuchi, Tokyo, Japan

[73] Assignee: Nara Machinery Co., Ltd., Tokyo, Japan

[21] Appl. No.: 995,174

[22] Filed: Dec. 24, 1992

[30] Foreign Application Priority Data

Dec. 25, 1991 [JP] Japan .................. 3-357163

[51] Int. Cl.⁶ ...................................... B05D 1/12
[52] U.S. Cl. ..................... 427/180; 427/212; 427/316
[58] Field of Search ................... 427/180, 212, 427/372, 316

[56] References Cited

U.S. PATENT DOCUMENTS

| | | | |
|---|---|---|---|
| 3,012,900 | 12/1961 | Kleinmann et al. | 427/212 |
| 4,129,666 | 12/1978 | Wizerkaniuk | 427/212 |
| 4,935,246 | 6/1990 | Ahrens | 427/212 |

FOREIGN PATENT DOCUMENTS 62-83029  4/1987  Japan .

*Primary Examiner*—Janyce Bell
*Attorney, Agent, or Firm*—Jacobson, Price, Holman & Stern

[57] ABSTRACT

The present invention is directed to a method for preparing composite particles by fixing, on the surface of a thermoplastic substance having an average particle diameter of 100 μm to 10 mm, a substance having a smaller size and more excellent heat resistance than the thermoplastic substance, the method being characterized by comprising the steps of heating the substance having a smaller size and more excellent heat resistance than the thermoplastic substance up to a temperature of not less than a softening point of the thermoplastic substance with stirring in an apparatus having a stirring mechanism and a heating mechanism; putting the thermoplastic substance in the apparatus; and then fixing the substance having the excellent heat resistance on the surface of the thermoplastic substance.

5 Claims, 4 Drawing Sheets

METHOD FOR PREPARING COMPOSITE PARTICLES

FIELD OF THE INVENTION AND RELATED ART STATEMENT

The present invention relates to a method for preparing composite particles by fixing, on the surfaces of thermoplastic substance particles having a relatively large particle diameter, particles having a particle diameter smaller than the above-mentioned thermoplastic substance particles and having excellent heat resistance.

Heretofore, various surface modifications of solid particles have been carried out for the purposes of preventing coagulation and discoloration/property change, improving dispersion properties, fluidity, catalytic effect, magnetic properties and weathering resistance, and controlling digestion/absorption of the particles.

Generally, the surface modification methods of powder particles can be roughly classified into (1) a modification method by coating, (2) a topochemical modification method which is a chemical modification technique utilizing functional groups on the surfaces of the particles, (3) a modification method by a mechanochemical reaction utilizing active points which appear on the surfaces of the particles by a mechanical function, (4) a modification method by capsulation, (5) a modification method utilizing high energy such as ultraviolet rays, radiation or plasma, and (6) a modification method by a precipitation reaction.

As a method for obtaining a functional composite powder material which comprises fixing, on the surfaces of solid particles (hereinafter referred to as "mother particles"), other solid particles (hereinafter referred to as "baby particles") having a particle diameter smaller than the above-mentioned mother particles, a high-speed air stream impact method (e.g., Japanese Patent Application Laid-open No. 83029/1987) which is one technique of the modification method by the capsulation in the above-mentioned paragraph (4) can be advantageously utilized.

The principle of this method is as follows: A rotary disc provided with hammer type or blade type impact pins on the periphery thereof is disposed in an impact chamber, and a collision ring is arranged along the outermost periphery orbital zone of an impact pins disposing section and at a certain interval therefrom. An air stream generated by the rotation of the impact pins is introduced and circulated into the impact chamber through a circulating passage extending from a certain position of the collision ring to the substantially central portion of the rotary disc, whereby the total amount of the powder particles comprising the mother particles and the baby particles is repeatedly circulated together with the air stream through the impact chamber and the circulating passage. As a result, the baby particles are allowed to adhere to the surfaces of the mother particles by a mechanical striking function by the impact pins and an impact striking function by the collision of the particles against the collision ring, or alternatively after the adhesion, the baby particles are buried in or fixed on the surfaces of the mother particles, thereby modifying the surfaces of the solid particles. According to this method, the baby particles are uniformly and strongly fixed all over the surfaces of the mother particles, and thus a composite power material having stable characteristics can be prepared with a good efficiency in an extremely short time (from several tens seconds to several minutes).

In the above-mentioned surface modification method of the solid particles, i.e., in the method in which the baby particles are buried in or fixed on the surfaces of the mother particles, the baby particles have higher hardness than the mother particles. On the other hand, when the mother particles have higher hardness and the baby particles have a low glass transition temperature of about 100° C., the baby particles are subjected to the above-mentioned impact type striking function in the impact chamber, whereby these baby particles are strongly fixed on the surfaces of the mother particles. In addition, the baby particles are successively subjected to (heat) energy by the impact striking function, and only at a temporary time when subjected to the impact striking function, the baby particles are softened/melted, and all or a part of the adjacent baby particles fixed on the surface of each mother particle are mutually fused, so that they are fixed in the form of a film on the surface of the mother particle.

However, the above-mentioned high-speed air stream impact method mainly utilizes the impact force by the impact pins disposed along the periphery of the rotary disc which can be rotated at a high speed as described above, and so the powder particles to which this method can be applied are naturally restricted. That is, the mother particles to which the above-mentioned modification method can usually be applied are limited to particles having an average particle diameter of 0.1 to 100 μm, depending upon physical properties of the powder particles. When the particles have a particle diameter more than this range, they tend to be ground by the above-mentioned impact force. In order to inhibit the grinding, it is necessary to lower the peripheral speed of the rotary disc. However, when the peripheral speed of the rotary disc is low, the impact force is also weak and the amount of the air stream generated by the rotation of the rotary disc decreases, that is, the air stream speed is low, so that an impact frequency per unit time of the powder particles which are circulated together with the air stream decreases. As a result, a time required for the modification is prolonged, and in consequence, the functional composite powder material cannot be prepared with a high efficiency any more.

OBJECT AND SUMMARY OF THE INVENTION

In view of the above-mentioned problems, an object of the present invention is to provide a method for preparing composite particles by fixing, on the surfaces of thermoplastic substance particles having a relatively large particle diameter, other particles having a particle diameter smaller than the thermoplastic substance particles and having excellent heat resistance.

In order to achieve the above-mentioned object, the present invention has been attained, and according to the present invention, the above-mentioned problems can be solved. The present invention is directed to a method for preparing composite particles by fixing, on the surfaces of a thermoplastic substance (mother particles) having an average particle diameter of 100 μm to 10 mm, a substance (baby particles) having a smaller size and more excellent heat resistance (higher softening point) than the thermoplastic substance, the method being characterized by comprising the steps of heating the baby particles with stirring up to a temperature of not less than a softening point of the mother particles in an apparatus having a stirring mechanism and a heating mechanism; putting the mother particles in the apparatus; and then stirring them, whereby the baby particles having the temperature of not less than the softening point of the mother particles are fixed on the surfaces of the mother particles. By this method, i.e., by forcedly stirring the mother particles and the baby particles heated up to the temperature of not less than the softening point of the mother particles to bring the baby particles into contact with the mother particles, the surfaces of the mother particles are only softened and melted only when the mother particles come in contact with the baby particles, so that the baby particles are fixed on the surfaces of the mother particles in such a state that the baby particles are buried in the mother particles so as to be at least partially exposed form the surfaces of the mother particles.

According to this method, the composite particles of a thermoplastic substance having improved apparent heat resistance can be prepared without changing the shape of the mother particles themselves and without grinding and deforming the baby particles.

DETAILED DESCRIPTION OF PREFERRED EMBODIMENTS

An apparatus for use in the practice of a method of the present invention is required to have a stirring mechanism and a heating mechanism as described above, and as this kind of apparatus, there can be used various apparatus such as a conductive heat transfer type grooved stirring dryer, a high-speed stirring type mixing granulator, a rolling granulator, a kneader, a ball mill and an emulsifier having the above-mentioned mechanisms.

As mother particles of composite particles, there can be used pellets or beads of various commercially available thermoplastic resins such as ABS, AS, MBS, vinyl chloride, polyacetal, polyamide, polyethylene, polypropylene, polyethylene terephthalate, polystyrene, polycarbonate and acrylics. The average particle diameter of the mother particles is preferably in the range of 100 μm to 10 mm. When it is less than 100 μm, dispersion properties of the mother particles are poor, so that it is difficult to uniformly fix baby particles on the surface of each mother particle.

On the other hand, the baby particles are required to have a softening point higher than the mother particles, and particularly suitable examples of the baby particles include particles of inorganic materials such as silica particles (glass beads and the like), alumina particles and zirconia particles, and particles of various metals which are excellent in heat resistance and wear resistance. The average particle diameter of the baby particles is smaller than that of the mother particles, and it is preferably about 1/10 or less of the average particle diameter of the mother particles (i.e., it is in the range of about 1 μm to 1 mm).

If a substance constituting the baby particles is more excellent in heat resistance and strength than the thermoplastic substance constituting the mother particles, composite particles can be prepared in which the apparent heat resistance and strength of the thermoplastic substance can be improved.

Furthermore, if the substance constituting the baby particles has more excellent heat resistance and sliding properties than the thermoplastic substance constituting the mother particles, the composite particles can be prepared in which the apparent heat resistance of the thermoplastic substance is improved and the sliding properties is also improved.

In any of the above-mentioned cases, the baby particles are fixed on the surfaces of the mother particles in such a state that the baby particles are at least partially exposed form the surfaces of the mother particles, and so the prepared composite particles have rough and uneven surfaces.

As the techniques for preparing the composite particles of the present invention, there are a continuous method and a batch-wise method, but either of them can be selected, taking the physical properties of the mother particles and the baby particles into consideration.

Figure 1:
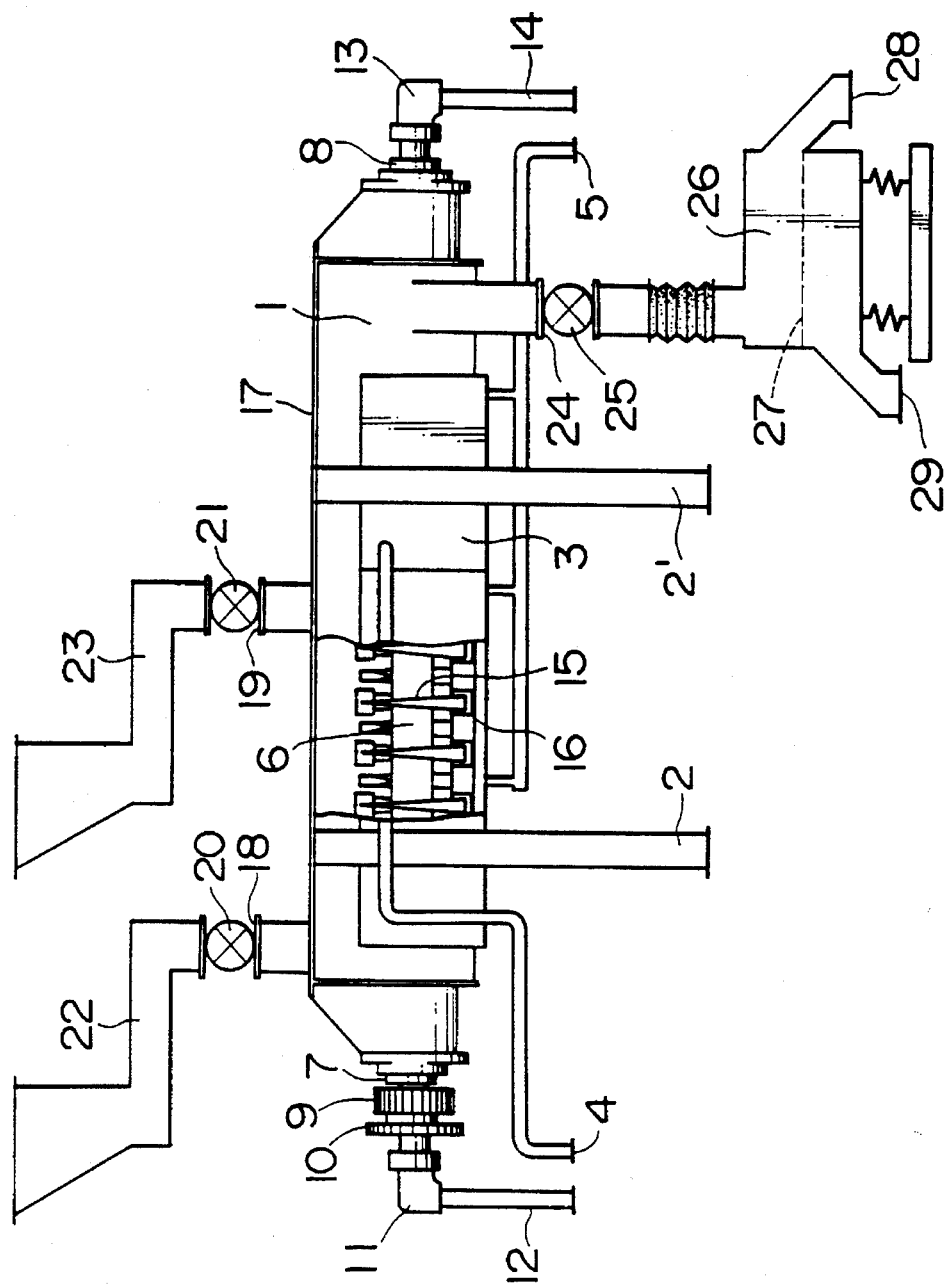
FIG. 1 is a systematic illustrative side view of a conductive heat transfer type grooved stirring dryer which is one example of apparatus for use in the practice of a continuous method of the present invention, and pretreatment and post-treatment devices are also shown together.

FIG. 1 is a systematic illustrative view of a conductive heat transfer type grooved stirring dryer with jackets which is one example of an apparatus having a stirring mechanism and a heating mechanism for use in the practice of a method of the present invention, and pretreatment and post-treatment devices are also shown together. A continuous method of the present invention will be described in detail in reference to this drawing.

A casing 1 is a relatively laterally prolonged container and it is supported by supporting rests 2, 2'. Jackets 3 for heat exchange are disposed all over the bottom and sides of the casing 1. Reference numerals 4 and 5 are an inlet and an outlet of a heat exchange medium to be fed to the jackets 3, respectively.

In the casing 1, two hollow shafts 6 are arranged in parallel through the casing 1 and rotatably supported by a bearing 7 disposed in the front portion and another bearing 8 disposed in the rear portion of the casing 1. The front portions of the respective shafts are provided with gears 9, which are mutually engaged so that they may be rotated mutually in reverse directions. One of the hollow shafts is provided with a sprocket 10, which is engaged with a chain (not shown) connected to a motor. The front portions of the respective shafts are connected to a heat exchange medium feed pipe 12 via a rotary joint 11, and the rear portions thereof are connected to a heat exchange medium discharge pipe 14 via a rotary joint 13.

Each hollow shaft 6 is provided with many heat exchangers at constant intervals. These heat exchangers are, for example, wedge-shaped hollow rotors 15. Each hollow rotor 15 is provided on the rear portion thereof with a scraper plate 16 for scraping a powder particle layer.

A cover 17 is disposed on the casing 1, and a feed inlet 18 of a raw material (baby particles) and another feed inlet 19 of another raw material (mother particles) are disposed on the front portion and the middle portion of the cover 17, respectively. These inlets are connected to a quantitative feeder 22 of the baby particles and another quantitative feeder 23 of the mother particles via rotary valves 20 and 21, respectively.

A discharge outlet 24 of treated composite articles is formed in the rear portion of the casing 1, and this discharge outlet 24 is connected to a separator 26 such as a vibrating sieve via a rotary valve 25. This separator 26 is provided with a net 27 having a mesh which is larger than the maximum particle diameter of the baby particles and smaller than the minimum particle diameter of the mother particles. In the separator 26, numeral 28 is a discharge outlet of the treated composite product, and numeral 29 is another discharge outlet of the extra baby particles which have not been fixed on the mother particles. The extra baby particles are fed through the feed inlet 18 of the raw material (the baby particles) again, and then reutilized.

Next, reference will be made to a method for preparing the composite particles by the use of this apparatus.

In the first place, the two hollow shafts 6 are rotated at a constant rotational frequency via the sprocket 10 by means of the motor. Next, a heat exchange medium such as warm water, steam or a heat transfer oil heated to a predetermined temperature is fed to the jackets 3 through the heat exchange medium inlet 4 to heat the jackets 3 to a certain temperature, and simultaneously the heat exchange medium is also fed to the hollow shafts 6 via the heat exchange medium feed pipe 12 and the rotary joint 11. In the case that the heat exchange medium is steam, this steam is discharged in the state of a condensed liquid through the heat exchange medium outlet 5 after heating the jackets 3. On the other hand, the steam fed to the hollow shafts 6 is discharged in the state of a condensed liquid through the rotary joint 13 and the heat exchange medium discharge outlet 14 after heating the hollow shafts 6 and the hollow rotors 15 to a certain temperature.

After the temperatures of the jackets 3 and the hollow rotors 15 have become constant, the baby particles are continuously fed to the casing 1 through the raw material feed inlet 18. The baby particles fed to the casing 1 receive thrust in a direction parallel with the longitudinal direction the casing 1 by the rotation of the hollow rotors 15, so that they are gradually moved toward the discharge outlet 24 through the casing 1, while the casing 1 is filled with the baby particles to some extent. In this step, the baby particles are stirred by the rotation of the hollow rotors 15, whereby heat is conducted and transferred from the hollow shafts 6, the hollow rotors 15 and the jackets 3 to the baby particles to raise the temperature of the baby particles uniformly up to a constant level. Needless to say, the heat transfer area and the rotational frequency of the hollow rotors 15, the temperature of the heat exchange medium and the like are adjusted so that the baby particles may be heated up to a predetermined temperature of not less than a softening point of the mother particles prior to reaching a substantially middle position of the casing 1, i.e., a position under the feed inlet 19 of the mother particles.

As the initially fed baby particles come up to the discharge outlet 24, the surface height of the baby particles gradually rises. However, when the height of the powder surface reaches the upper edge of a dam plate (not shown) disposed just above the discharge outlet 24, the amount of the continuously fed baby particles is balanced with that of the baby particles which overflow beyond the upper edge of the dam plate, so that the surface height of the powder does not increase any more and it is maintained at a constant level. When the surface height of the baby particles layer has reached the upper edge of the overflow dam plate and has risen to upper positions of the hollow rotors 15 and the jackets 3, the mother particles are continuously fed to the casing 1 through the raw material feed inlet 19. The reasons why the baby particles are placed in the casing 1 so much as to reach the upper positions of the hollow rotors 15 and the jackets 3 are that the mother particles having low heat resistance can be prevented from directly coming in contact with the hollow shafts 6, the hollow rotors 15 and the jackets 3 to adhere to the hollow rotors 15, the jackets 3 and the like, and that the softened mother particles are prevented from mutually fusing to form blocks. The mother particles fed in the casing 1 are stirred and uniformly mixed with the baby particles by the rotation of the hollow rotors 15. Since the baby particles are previously heated to a temperature of not less than the softening point of the mother particles, the baby particles soften/melt the contacted surfaces only of the mother particles, and they are fixed on the mother particles in such a state as to be buried in the mother particles. Here, the baby particles are preferably fixed on the surfaces of the mother particles in such a state that the baby particles are buried in the mother particles so as to be at least partially exposed form the surfaces of the mother particles. An exposing ratio of the baby particles can be controlled by adjusting the temperature of the heat exchange medium and the residence time of the powder particles (a time of from the feed to the discharge of the powder particles). However, conditions such as the rotational frequency of the hollow shafts 6, the temperature of the heat exchange medium and the residence time are required to be set so that the mother particles may not be deformed by the softening/melting and the forced stirring and so that the baby particles may not be ground and deformed by the forced stirring.

After the above operation has been repeated, the resultant powder of the composite particles is discharged through the discharge outlet 24 and then separated into the product (the composite particles) and the extra baby particles which have not been fixed on the mother particles by the separator 26, and they are discharged through the discharge outlets 28 and 29, respectively. It is preferred that the separator 26 is under the operation prior to the discharge of the composite particles by the separator 26. The extra baby particles can be returned to the quantitative feeder 22 of the baby particles by means of a transport such as a spinder, and then reutilized.

Figure 2:
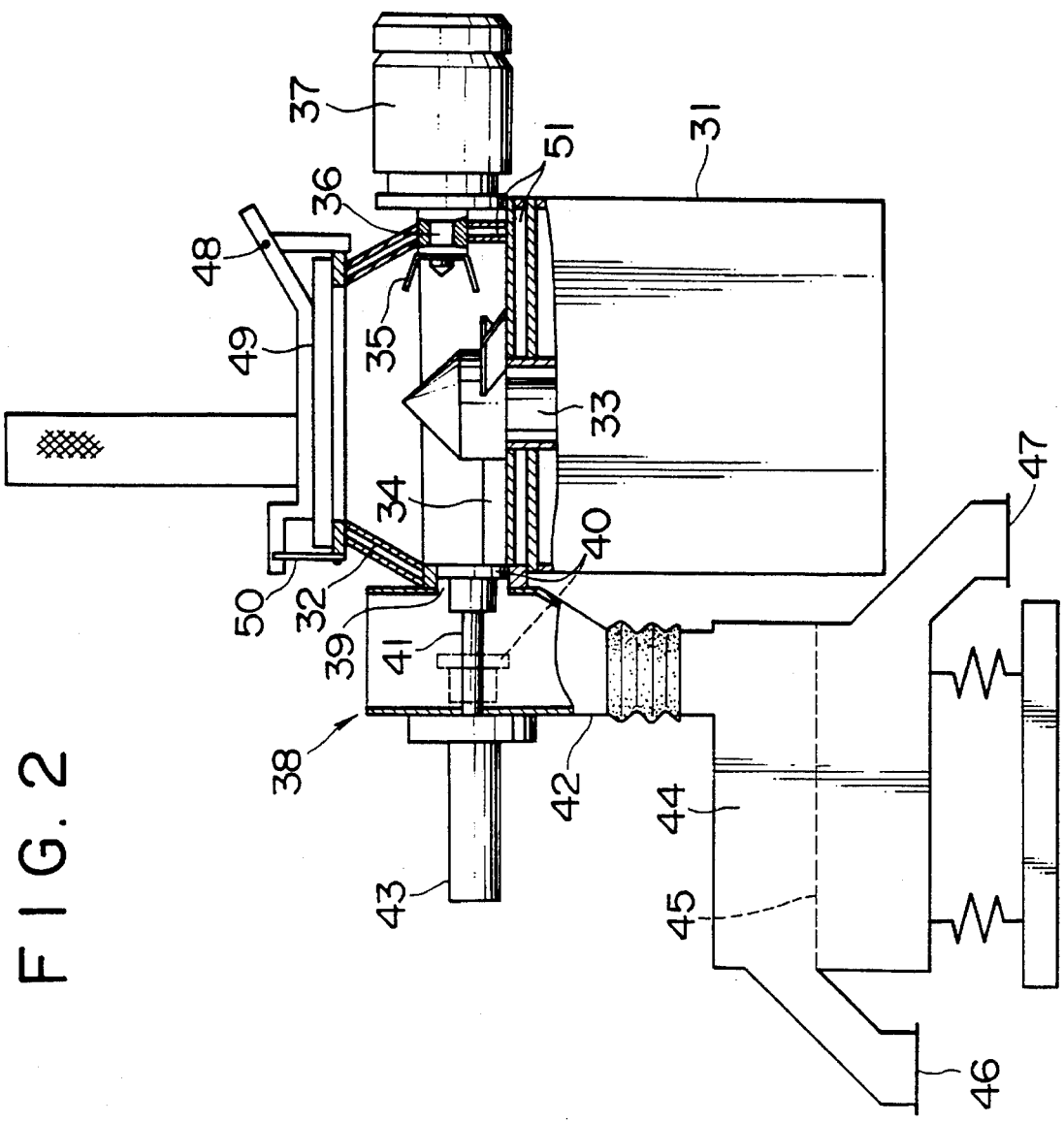
FIG. 2 is a side sectional view of a high-speed stirring type mixing granulator which is one example of apparatus for use in the practice of a batch-wise method of the present invention, and a post-treatment device is also shown together.

FIG. 2 is a systematic illustrative view of a usual high-speed stirring type mixing granulator for use in the practice of the method of the present invention, and a post-treatment device is also shown together. In reference to the same drawing, a batch-wise method of the present invention will be described in detail.

The above-mentioned granulator is composed of a base box 31 and a container 32, and in the base box 31, a motor (not shown) is disposed. In the container 32, there are disposed main stirring blades 34 attached to a driving shaft 33 and auxiliary blades 35 which project in a direction vertical to the axial direction of the main stirring blades 34, and the auxiliary blades 35 are adapted to be driven via a driving shaft 36 by a motor 37. On the side of the container 32, a discharge device 38 is attached which is composed of a discharge outlet 39, a discharge valve 40 which is fitted in the outlet 39, a discharge rod 41, a discharge shoot 42 and an air cylinder 43 for discharge. The lower portion of the discharge shoot 42 is connected to a separator 44, as in the case of the continuous practice of the present invention (FIG. 1). As in FIG. 1, in the separator 44, numeral 45 is a net, numeral 46 is a discharge outlet of the product (the composite particles), and numeral 47 is a discharge outlet of the extra baby particles.

An upper lid 49 is openably disposed on the container 32 by a hinge 48 and is adapted to tightly close the container 32 with the aid of a fastening fitting member 50.

Furthermore, the bottom and the sides of the container 32 have jackets 51 structure, and a heat exchange medium can be continuously fed to the jackets 51 through a heat exchange medium feed inlet (not shown) and a discharge outlet (not shown).

Next, reference will be made to a method for preparing the composite particles by the use of this apparatus.

In the first place, the heat exchange medium is fed at a constant flow rate through the heat exchange medium feed inlet to the jackets 51 heated to a predetermined temperature. In the case that the heat exchange medium is steam, the steam is discharged in the state of a condensed liquid through the discharge outlet, after heating the jackets 51. After the temperature of the jackets 51 has become constant, the upper lid 49 is opened, and metered baby particles are put in the container 32. The main stirring blades 34 and the auxiliary blades 35 are rotated at a predetermined rotational frequency, whereby the baby particles are vigorously rotated in a horizontal direction in the container 32 by the rotation of the main stirring blades 34, and simultaneously centrifugal force is applied to the baby particles. Thus, the baby particles reach the outer wall of the container B2, and then they rapidly return to the substantially central portion of the main stirring blades 33 by a contrarotating function in an upper shrunk portion of the container 32. As described above, the baby particles are heated to a predetermined temperature in a short period of time by heat transferred from the jackets 51 under a convectional function by the so-called straw rope making movement and a local high-speed shear mixing function by the auxiliary blades 35 in the container 32.

When it has been confirmed by a thermometer inserted into the container 32 that the baby particles layer in the container 32 reaches a predetermined temperature, the rotation of the main stirring blades 34 and the auxiliary blades 35 is once stopped. Next, the upper lid 49 is opened, and the metered baby particles are put in the container 32, and afterward, the upper lid 49 is closed again and the main stirring blades 34 and the auxiliary blades 35 are rotated again at a predetermined rotational frequency. Both the particles undergo the above-mentioned composite function, whereby they are closely mixed in an extremely short period of time. At this time, the temperature of the baby particles is already elevated to not less than the softening point of the mother particles, and therefore the baby particles soften and melt the surface sites only of the mother particles which are brought into contact with the baby particles, so that the baby particles are fixed as to be buried in the mother particles. As in the case of the continuous practice of the present invention described above, the baby particles are preferably fixed on the surfaces of the mother particles in such a state that the baby particles are buried in the mother particles so as to be at least partially exposed form the surfaces of the mother particles. An exposing ratio of the baby particles can be controlled by adjusting the temperature of the heat exchange medium, the rotational frequency of the main stirring blades 34 and/or the auxiliary blades 35 and a treatment time. Furthermore, for the purpose of preventing the mother particles from adhering to the inside wall of the container 32, an operating procedure can be regulated, and for example, after the mother particles have been fed to the container 32, it may be stopped to feed the heat exchange medium to the jackets 51.

However, conditions such as the rotational frequency of the main stirring blades and the auxiliary blades, the temperature of the heat exchange medium and the treatment time are required to be set so that the mother particles may not be deformed by the softening/melting and the composite function of both the blades and so that the baby particles may not be ground and deformed by the above-mentioned composite function. After the same operation has been repeated for a certain time, the discharge valve 40 is moved in a left direction (to a position denoted by a dotted line) in FIG. 2 via the discharge rod 41 by means of the air cylinder 43 for discharge to open the discharge outlet 39, whereby the thus obtained composite powder particles are rapidly discharged to the separator 44 through the discharge shoot 42. In this separator 44, the product is separated from the extra baby particles which have not been fixed on the mother particles, and they are discharged through the discharge outlets 46 and 47, respectively. As in the case of the above-mentioned continuous treatment, the extra baby particles can be reutilized in the next modification treatment.

Next, an embodiment of the method of the present invention for preparing the composite particles will be described in reference to a typical example.

1) The composite particles were continuously prepared using vinyl chloride pellets (Φ4 mm×4 mm) as mother particles and spherical glass beads (average particle diameter=50 μm) as baby particles.

A selected conductive heat transfer type grooved stirring dryer was a buddle dryer (NPD-1.6W; made by Nara Machine Works Co., Ltd.) having an effective volume of 77 liters.

In the first place, steam of 4 kg/cm$^2$ (G) was introduced into jackets and hollow axes of the buddle dryer, and glass beads were then fed from a feeder to the buddle dryer at 500 kg/hr. Afterward, the glass beads were previously heated with stirring.

After it was confirmed by a thermometer in the dryer that the temperature of the glass beads were sufficiently high (the temperature of the beads=100° C.), vinyl chloride pellets were fed thereto at 300 kg/hr, followed by heating and stirring. After a residence time of about 10 minutes, the resultant powder of composite particles overflowed to a separator through a discharge outlet, and in this separator, the powder of the composite particles was separated into the composite particles in which the glass beads were fixed on the surfaces of the vinyl chloride pellets and the extra glass beads which were not fixed, and they were then discharged.

2) Composite particles were prepared using spherical foamable acrylic resin beads (1 to 2 mm) as mother particles and spherical glass beads (average particle diameter=50 μm) as baby particles by a batch-wise system.

A selected high-speed stirring type mixing granulator was a laboratory matrix (LMA-10; made by Nara Machine Works Co., Ltd.) having a total volume of 10 liters and an effective volume of 6 liters.

In the first place, 3 kg/cm$^2$ (G) of steam were fed to jackets of the laboratory matrix, and a lid was then opened and 4 kg of glass beads were put in the laboratory matrix. Main stirring blades and auxiliary blades were rotated at 150 rpm and 1500 rpm, respectively, and the glass beads were heated with stirring.

After it was confirmed by a thermometer in the laboratory matrix that the temperature of the glass beads was sufficiently high (the temperature of the beads=90° C.), the rotation of the main stirring blades and the auxiliary blades was once stopped, and 5 kg of acrylic resin beads were put therein. Afterward, the main stirring blades and the auxiliary blades were rotated again to sufficiently stir the acrylic resin beads and the glass beads, thereby obtaining composite particles. After 5 minutes have elapsed, a discharge valve was moved to open a discharge outlet, so that the powder of the composite particles was discharged to a separator in a short period of time. In the separator, the powder of the composite particles was separated into the composite particles in which the glass beads were fixed on the surfaces of the acrylic resin beads and the extra glass beads which were not fixed, and they were then discharged. [Evaluation of Composite Particles]

Figure 3:
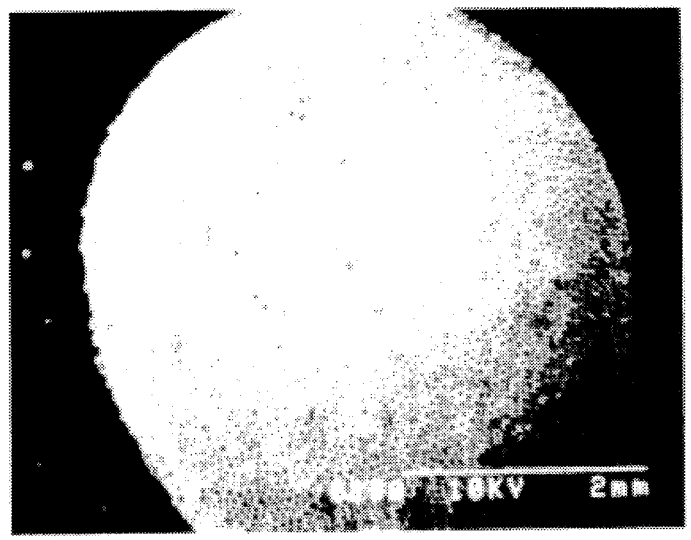
FIG. 3 is a photograph of the particle structure of a composite particle obtained in an example of the present invention by a scanning electron microscope.
Figure 4:
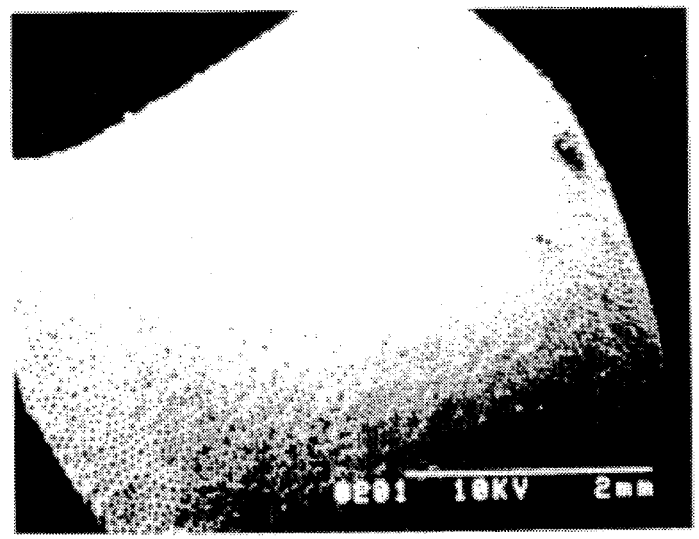
FIG. 4 is a photograph of the particle structure on the side of the composite particle shown in FIG. 3 by the scanning electron microscope.
Figure 5:
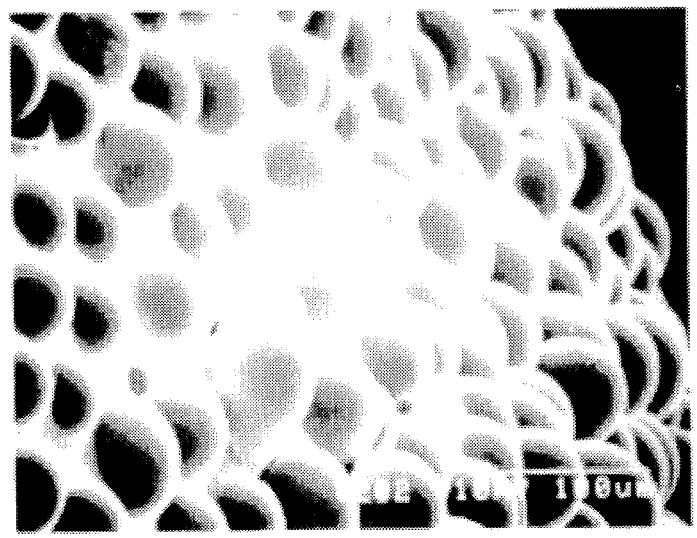
FIG. 5 is an enlarged photograph of particle structure in FIG. 4 by the scanning electron microscope.

FIGS. 3 to 5 show photographs of the particle structures of the composite particles obtained in the above-mentioned typical example 1) by a scanning electron microscope (hereinafter referred to as "SEM"). It is apparent from FIGS. 3 and 4 that glass beads are uniformly and closely fixed on the bottom and sides of cylindrical vinyl chloride pellets. Furthermore, it is definite from FIG. 5 that the respective glass beads are fixed on the surfaces of the vinyl chloride pellets in such a state that about half of each glass bead is buried in the vinyl chloride pellet. In addition, it is elucidated from these photographs that the glass beads are fixed on the vinyl chloride pellets without being ground. Moreover, it is also apparent that the vinyl chloride pellets themselves are not deformed.

Figure 6:
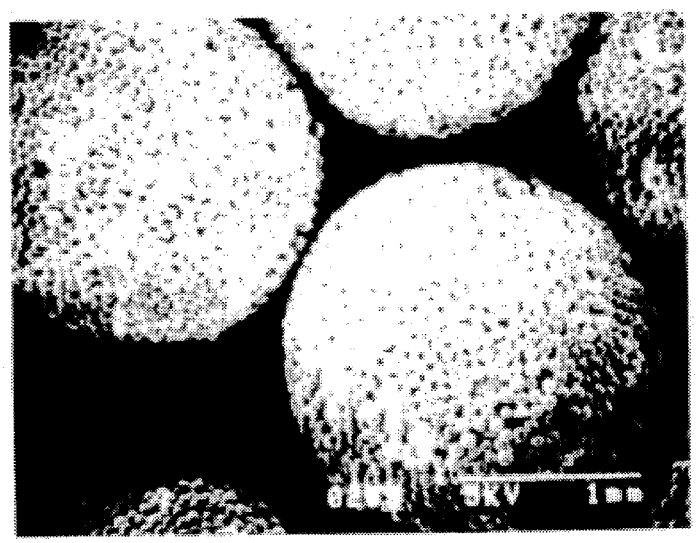
FIG. 6 is a photograph of the particle structure of a composite particle obtained in another example of the present invention by the scanning electron microscope.

FIG. 6 shows an SEM photograph of the particle structure of the composite particles obtained in the above-mentioned typical example 2). Foamable acrylic resin beads can foam when brought into contact with the heated glass beads, but they shrink when cooled. Therefore, it is definite from FIG. 6 that the glass beads are uniformly and closely fixed on the surfaces of the resin beads, as in the case of the example 1). It is also apparent that the glass beads are fixed on the foamable acrylic resin beads without being ground, as in the case of the example 1). In addition, it is apparent that the foamable acrylic resin beads themselves are not deformed.

As described above in detail, in an apparatus having a stirring mechanism and a heating mechanism, a substance (baby particles) having a smaller size and more excellent heat resistance than a thermoplastic substance (mother particles) is first heated to a temperature of not less than a softening point of the thermoplastic substance with stirring, and the thermoplastic substance is put in the apparatus, followed by stirring, whereby the baby particles having a smaller size and more excellent heat resistance than the mother particles can be fixed on the surfaces of the mother particles.

According to the method of the present invention, composite particles in which the apparent heat resistance of the thermoplastic substance is improved can be prepared.

When a substance having more excellent strength than the thermoplastic substance is used as the baby particles, the composite particles in which the apparent heat resistance of the thermoplastic substance and hardness are improved can be prepared.

When a substance having more excellent sliding properties than the thermoplastic substance is used as the baby particles, the composite particles in which the apparent heat resistance of the thermoplastic substance and sliding properties are improved can be prepared.

The composite particles having rough and uneven surfaces can be prepared.

The preparation of the composite particles can be carried out without deforming the particles themselves of the thermoplastic substance and without grinding and deforming the various baby particles.

In addition, when colored resin pellets are used as the particles of the thermoplastic substance, the present invention permits preparing composite particles in which glass beads as a reflective agent are fixed on the surfaces of the pellets, and the thus prepared composite particles can be used to obtain a recurrently reflective coating material.

I claim:

1. A method for preparing composite particles by fixing on the surface of a thermoplastic substance having an average particle diameter of 100 μm to 10 mm a higher softening point substance having a smaller size and a softening point higher than that of the thermoplastic substance, said method comprising the steps of:

heating said higher softening point substance up to a temperature of not less than a softening point of said thermoplastic substance and simultaneously stirring the higher softening point substance in an apparatus having a stirring mechanism and a heating mechanism;

introducing said thermoplastic substance into said apparatus; and fixing said higher softening point substance on the surface of said thermoplastic substance by melting into surfaces of the thermoplastic substance and being at least partially buried in the thermoplastic substance.

2. The method for preparing composite particles according to claim 1, wherein said higher softening point substance is a substance having greater strength than said thermoplastic substance.

3. The method for preparing composite particles according to claim 1, wherein said higher softening point substance is a substance having sliding properties which are better than said thermoplastic substance.

4. The method for preparing composite particles according to claim 1, wherein said composite particles have rough and uneven surfaces.

5. A method for preparing composite particles by fixing on the surface of a thermoplastic substance having an average particle diameter of 100 μm to 10 mm a higher softening point substance having a smaller size and a softening point higher than that of the thermoplastic substance and having better sliding properties than the thermoplastic substance, said method comprising the steps of:

heating said higher softening point substance up to a temperature of not less than a softening point of said thermoplastic substance and simultaneously stirring the higher softening point substance in an apparatus having a stirring mechanism and a heating mechanism;

introducing said thermoplastic substance into said apparatus; and fixing said higher softening point substance on the surface of said thermoplastic substance by melting into surfaces of the thermoplastic substance and being at least partially buried in the thermoplastic substance to form composite particles having rough and uneven surfaces.

* * * * *